United States Patent
Allinson et al.

(10) Patent No.: US 10,505,928 B2
(45) Date of Patent: *Dec. 10, 2019

(54) FACILITATION OF SERVICE LOGIN

(71) Applicant: Oath Inc., New York, NY (US)

(72) Inventors: Richard Stephen Allinson, Morgan Hill, CA (US); Chris Stoner, San Jose, CA (US); Manoj Palki, Santa Clara, CA (US)

(73) Assignee: Oath Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/888,174

(22) Filed: Feb. 5, 2018

(65) Prior Publication Data
US 2018/0159850 A1   Jun. 7, 2018

Related U.S. Application Data

(63) Continuation of application No. 14/671,026, filed on Mar. 27, 2015, now Pat. No. 9,887,991.

(51) Int. Cl.
| | |
|---|---|
| *H04L 29/06* | (2006.01) |
| *G06F 21/34* | (2013.01) |
| *H04L 9/32* | (2006.01) |

(52) U.S. Cl.
CPC .......... *H04L 63/0853* (2013.01); *G06F 21/34* (2013.01); *H04L 9/3234* (2013.01); *H04L 63/083* (2013.01); *H04L 63/0884* (2013.01)

(58) Field of Classification Search
CPC ............... H04L 63/0853; H04L 63/083; H04L 63/0884; H04L 9/3234; G06F 21/34

USPC ......................................... 713/155
See application file for complete search history.

(56) References Cited

U.S. PATENT DOCUMENTS

| | | | | | |
|---|---|---|---|---|---|
| 7,240,211 | B2* | 7/2007 | Hillhouse | ........... | H04L 67/1002 709/225 |
| 8,566,911 | B2* | 10/2013 | Tu | ........... | G06F 21/42 455/411 |
| 2008/0086767 | A1* | 4/2008 | Kulkarni | ........... | H04L 63/08 726/9 |
| 2011/0219230 | A1* | 9/2011 | Oberheide | ........... | H04L 9/32 713/168 |
| 2013/0023240 | A1* | 1/2013 | Weiner | ........... | H04W 12/06 455/411 |
| 2013/0328801 | A1* | 12/2013 | Quigley | ........... | G06Q 20/3674 345/173 |

(Continued)

*Primary Examiner* — Khalil Naghdali
(74) *Attorney, Agent, or Firm* — Cooper Legal Group, LLC

(57) ABSTRACT

As provided herein, a first device may be registered as authorized to authenticate a user login into a service from a second device (e.g., a smart phone may be used to log the user into a webmail service on a computer without the user having to enter a password through the computer). Responsive to the user attempting to access the service through the second device, a login interface may be displayed on the first device. The user may confirm or deny that the user wants to log into the service on the second device, thus allowing the user to seamlessly log into the service on the second device (e.g., without entering a password) while mitigating unauthorized logins into the service from unknown devices. Further, the user may use the first device to delegate the authority to authenticate the user login into the service to one or more other devices.

20 Claims, 12 Drawing Sheets

(56) References Cited

U.S. PATENT DOCUMENTS

| | | | |
|---|---|---|---|
| 2014/0189808 A1* | 7/2014 | Mahaffey | H04L 63/083 726/4 |
| 2014/0245396 A1* | 8/2014 | Oberheide | H04L 63/08 726/4 |
| 2014/0281533 A1* | 9/2014 | de Andrade | H04L 63/08 713/168 |
| 2015/0007273 A1* | 1/2015 | Lin | H04L 63/08 726/4 |
| 2016/0261411 A1* | 9/2016 | Yau | H04L 63/0807 |
| 2016/0269396 A1* | 9/2016 | Ren | H04W 12/06 |

* cited by examiner

FACILITATION OF SERVICE LOGIN

RELATED APPLICATION

This application claims priority to and is a continuation of U.S. application Ser. No. 14/671,026, filed on Mar. 27, 2015, entitled "FACILITATION OF SERVICE LOGIN", which is incorporated herein.

BACKGROUND

Users may log into websites, applications, and/or services using various usernames and/or passwords. If a user utilizes the same username and password for multiple services, then a malicious user that identifies the username and password may obtain access to all of the services. In an example, if the user uses a first username and password combination at Benny's Restaurant website (e.g., a website with little to no security), then a malicious user may easily access the first username and password combination and use the first username and password combination on other websites (e.g., a website with higher security, such as a banking website, a webmail website, etc.). If the user does not use the same username and/or password for multiple services, then the user may forget what username and/or password corresponds to a particular service. The user may be locked out after one or more failed attempts at logging into a service using a wrong password. Unfortunately, many computing devices and/or content providers may lack technology to protect users from being locked out, prevent the user's account from being hacked, and/or provide seamless access to services from multiple devices.

SUMMARY

In accordance with the present disclosure, one or more systems and/or methods for facilitating service login are provided. A first device (e.g., a smart phone) may be registered as having authorization to authenticate a user for accessing a service from a second device (e.g., smart television). The registration of the first device may be maintained on a service login management component (e.g., comprising an authorization database, a server, etc.). The registration may specify a trust level for the first device. The trust level may be modified based upon at least one of successful authentication or unsuccessful authentication of the user by the first device.

In an example, the user may attempt to access the service from the second device. An access request, requesting access to the service, may be received by the service login management component from the second device. The access request may specify a username and device authorization information (e.g., an indication that the first device is authorized to authenticate the user for accessing the service from the second device). In an example, the device authorization information may be stored within a login management cookie on the second device. Responsive to the receipt of the access request, an encrypted request may be sent to the first device from the service login management component.

Responsive to receiving the encrypted request, the first device may prompt the user to specify whether the user wants to authorize a login into the service from the second device. Responsive to the user selecting an option to log the second device into the service, the first device may send a login user authorization notification to the service login management component. Responsive to the service login management component receiving the login user authorization notification from the first device, the service login management component may log the user into the service on the second device (e.g., without prompting the user to enter a password into the second device).

In an example, a count of user logins from the second device may be maintained by the service login management component. Responsive to the count exceeding a threshold, the second device may be instructed by the service login management component to facilitate non-credential logins (e.g., a login without a username and/or password) with the service based upon authorization provided by the first device.

In an example, an authorization delegation request, to delegate authorization to a third device for logging the user into the service on the second device, may be received by the service login management component from the first device. The third device may be registered as having authorization to authenticate the user for accessing the service from the second device. A second registration of the third device may be maintained by the service login management component. The second registration may specify a second trust level for the third device. Responsive to the second trust level exceeding a trust level threshold, a push channel to the third device may be opened by the service login management component for authenticating the user for accessing the service from the second device.

In an example, a first viability score of the first device corresponding to the user may be determined. A second viability score of the third device corresponding to the user may be determined. Responsive to the second viability score being greater than the first viability score, the encrypted request may be sent to the third device using the push channel.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
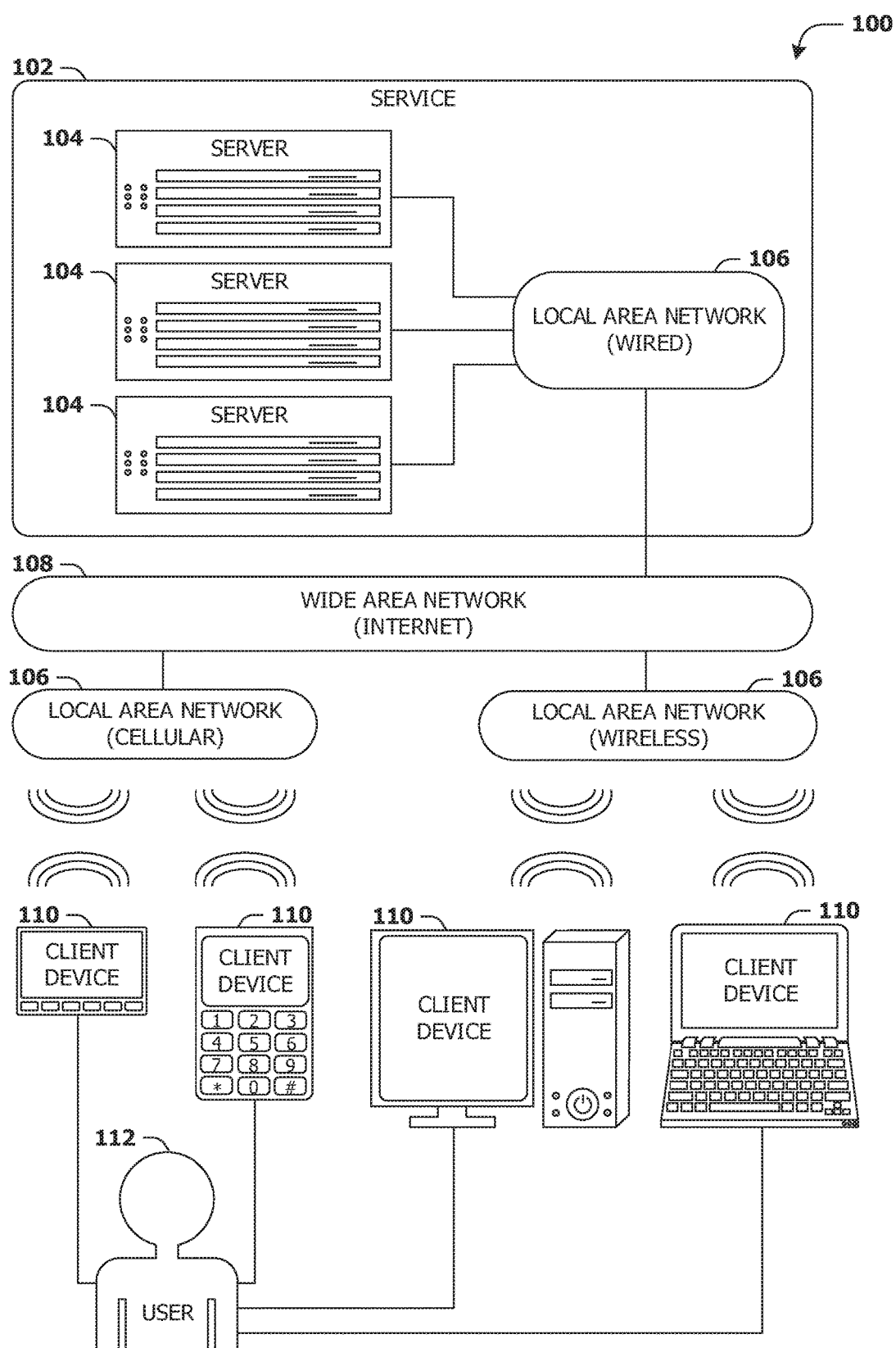
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
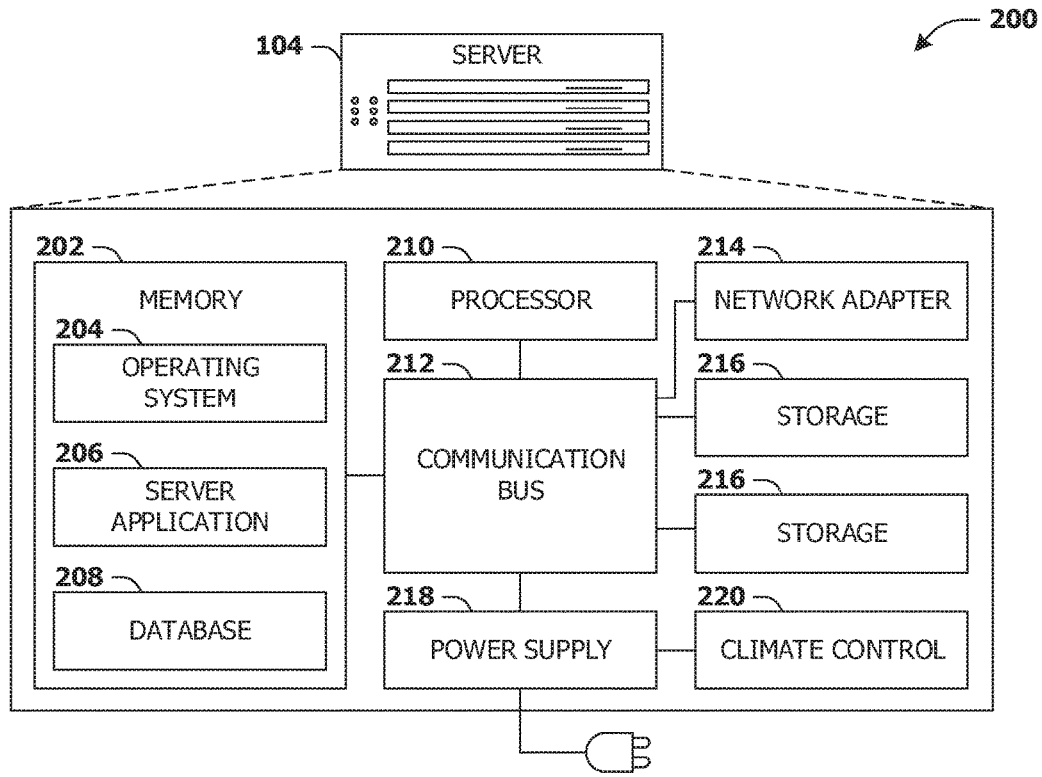
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system.

The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
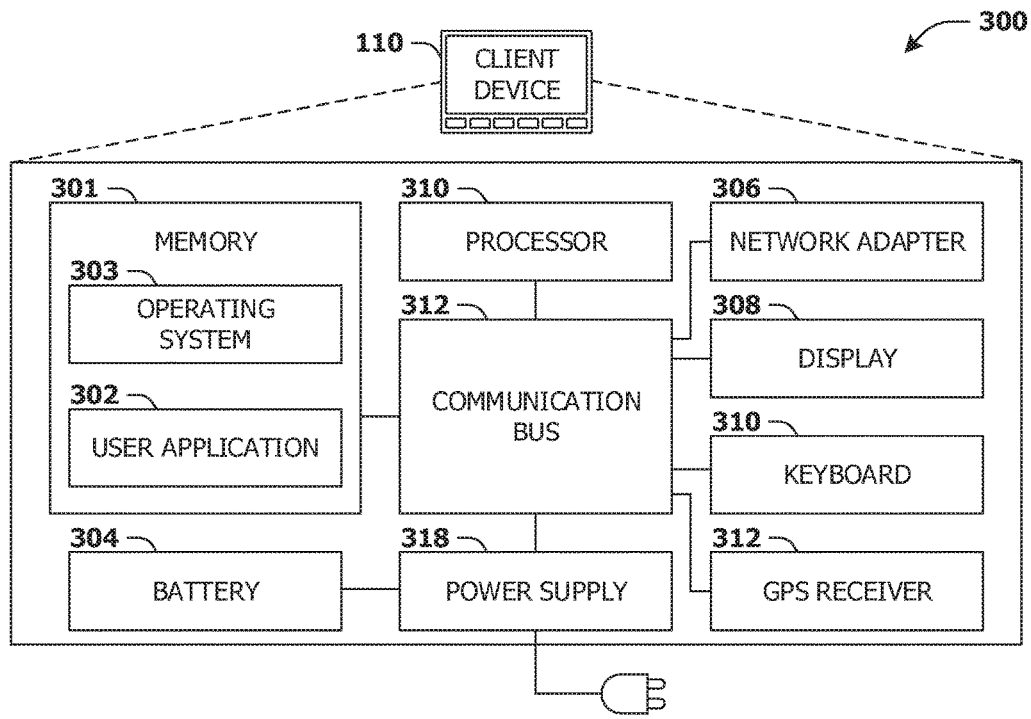
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 210 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 310, a mouse, a microphone, a camera, and/or a touch-sensitive component of the display 308; and/or environmental sensors, such as a global positioning system (GPS) receiver 312 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more systems and/or techniques for facilitating service login are provided. Because a user may have different usernames and passwords for various websites, applications, and/or services, it may be advantageous to help manage such login credentials for the user. For example, having a multitude of usernames and/or passwords may cause the user to forget a particular login credential (e.g., a username and password combination) for a service, and thus the user may be locked out of the service after one or more failed login attempts.

As provided herein, a first device may be registered as authorized to authenticate a user login into a service from a second device (e.g., a smart phone of the user may be used to log the user into a media streaming service on a smart television without the user having to enter a password for the media streaming service through the smart television). In this way, the first device (e.g., a mobile device that the user may conveniently carry around) may be used to securely log the user into services on various devices without the user having to enter passwords through such devices, which improves security of data transmission to the second device (e.g., so that a malicious user is not accessing user data provided by the service to the second device by merely attempting to provide login credentials directly through the second computer) because the first device authenticates the user for accessing the service on the second device.

Figure 4:
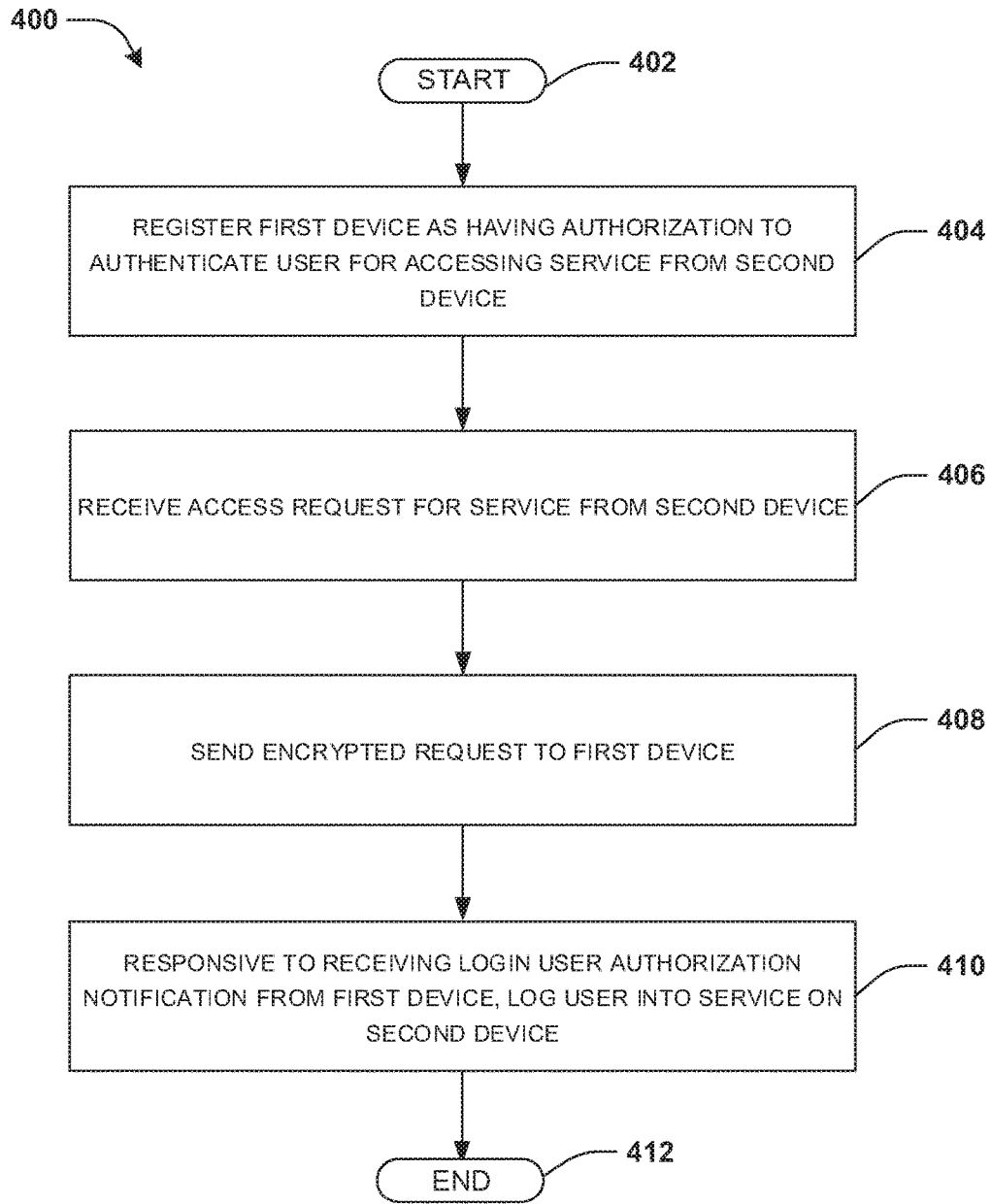
FIG. 4 is a flow chart illustrating an example method of facilitating service login.

An embodiment of facilitating service login is illustrated by an example method 400 of FIG. 4. At 402, the method 400 starts. At 404, a first device (e.g., a mobile computing device) is registered as having authorization to authenticate a user for accessing a service (e.g., an application, a web service, an email provider, a website, etc.) from a second device (e.g., a shared school computer that the user may routinely use). In an example, the user of the first device may install a login application on the first device. The login application may utilize a push notification service for obtaining a push token used for communicating with the service. In an example, the user may log into the service using a username and/or a password, such as from the second device (e.g., using a browser on the second device). In an example, the browser, on the second device, may store device authorization information (e.g., cookies). Once the user successfully logs into the service, the user may register the first device, as being authorized to authenticate the user for accessing the service from the second device, without the user having to supply a password, through the second device, to the service during login through the second device.

The user may register the first device by requesting a verification code from the service, such as from a service login management component associated with the service (e.g., a verification code request may be sent to the service from the second device). The service login management component may associate and store the verification code with the account of the user within an authorization database based upon the user's username and/or password. The service login management component may send the verification code to the second device. The user may be presented, such as through the login application on the first device, with a registration page comprising a prompt to enter the username and the verification code. An encryption key request may be sent from the first device to the service login management component. The encryption key request may comprise the username, verification code, and/or the push token. Responsive to the verification code, the username, and/or the push token matching an entry within the authorization database, the service login management component may generate an encryption key. The service login management component may store the encryption key within the authorization database. The encryption key may be associated with the username, the password, the push token, etc.

stored within the authorization database (e.g., the encryption code may be used to decrypt encrypted messages from the first device).

The service login management component may send the encryption key to the first device. The first device may store the encryption key. In an example, the encryption key may be stored by the login application. Responsive to the first device receiving the encryption key, the first device may display a registration notification indicating that the first device is registered. The registration of the first device may be maintained within the authorization database and may comprise a trust level for the first device. In an example, device authorization information (e.g., a cookie, such as a login management cookie, comprising the username, the password, the push token, and/or an indication that the first device is authorized to authenticate the user for accessing the service from the second device) may be stored on the second device.

After registration, the user may utilize the second device to log into the service (e.g., the user may desire to log into an email website from the shared school computer). For example, the user may input the username into a login interface displayed by the second device. The second device may send an access request to the service responsive to the attempt to log into the service. The access request may comprise the username and/or the device authorization information.

At 406, the access request may be received from the second device. The service login management component may extract the username from the access request. The service login management component may retrieve the push token and the encryption key associated with the username from the authorization database. The service login management component may encrypt a request using the encryption key to generate an encrypted request.

At 408, the encrypted request may be sent to the first device. The first device may utilize the encryption key (e.g., stored on the first device) to decrypt the request. The first device may display a login interface. The login interface may offer an option to authenticate the request (e.g., the user may indicate that the user wants to log the second device into the service) or deny the request (e.g., the user may indicate that the user does not want to log the second device into the service). Responsive to the user authenticating the request, a login user authorization notification may be generated. The login user authorization notification may be encrypted using the encryption key to create an encrypted login user authorization notification. The encrypted login user authorization notification may be sent to the service login management component. The service login management component may decrypt the encrypted login user authorization notification.

At 410, responsive to receiving the login user authorization notification from the first device, in response to the encrypted request, the user may be logged into the service on the second device. In an example, the user may be logged into the service on the second device without inputting the password. The trust level may be altered based upon at least one of successful authentication or unsuccessful authentication of the user by the first device (e.g., the trust level may increase based upon a successful authentication and the trust level may decrease based upon an unsuccessful authentication).

Responsive to the user not authenticating the request, a login user dissent notification may be generated. The login user dissent notification may be encrypted using the encryption key to create an encrypted login user dissent notification. Responsive to the service login management component receiving the login user dissent notification, the service login management component may prevent the login of the user into the service from the second device.

A count of user logins from the second device may be maintained by the service login management component. Responsive to the count exceeding a threshold, the second device may be instructed, by the service login management component, to facilitate non-credential logins (e.g., a login without a username and/or password) with the service. In an example, the first device may delegate authority for other devices to authenticate the user for accessing the service from the second device. At 412, the method 400 ends.

Figure 5A:
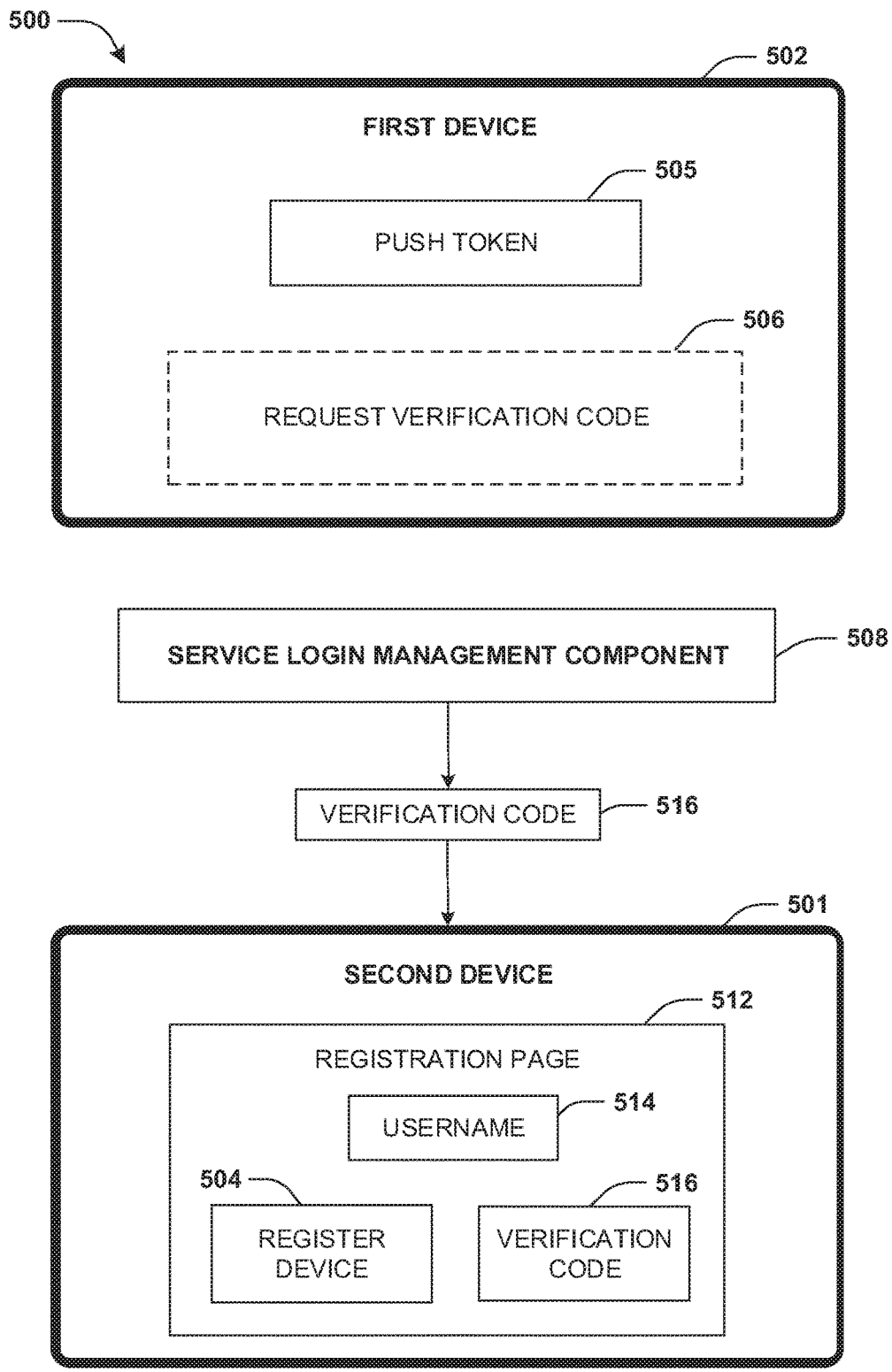
FIG. 5A is a component block diagram illustrating an example system for registration of a first device, where a verification code is generated.
Figure 5B:
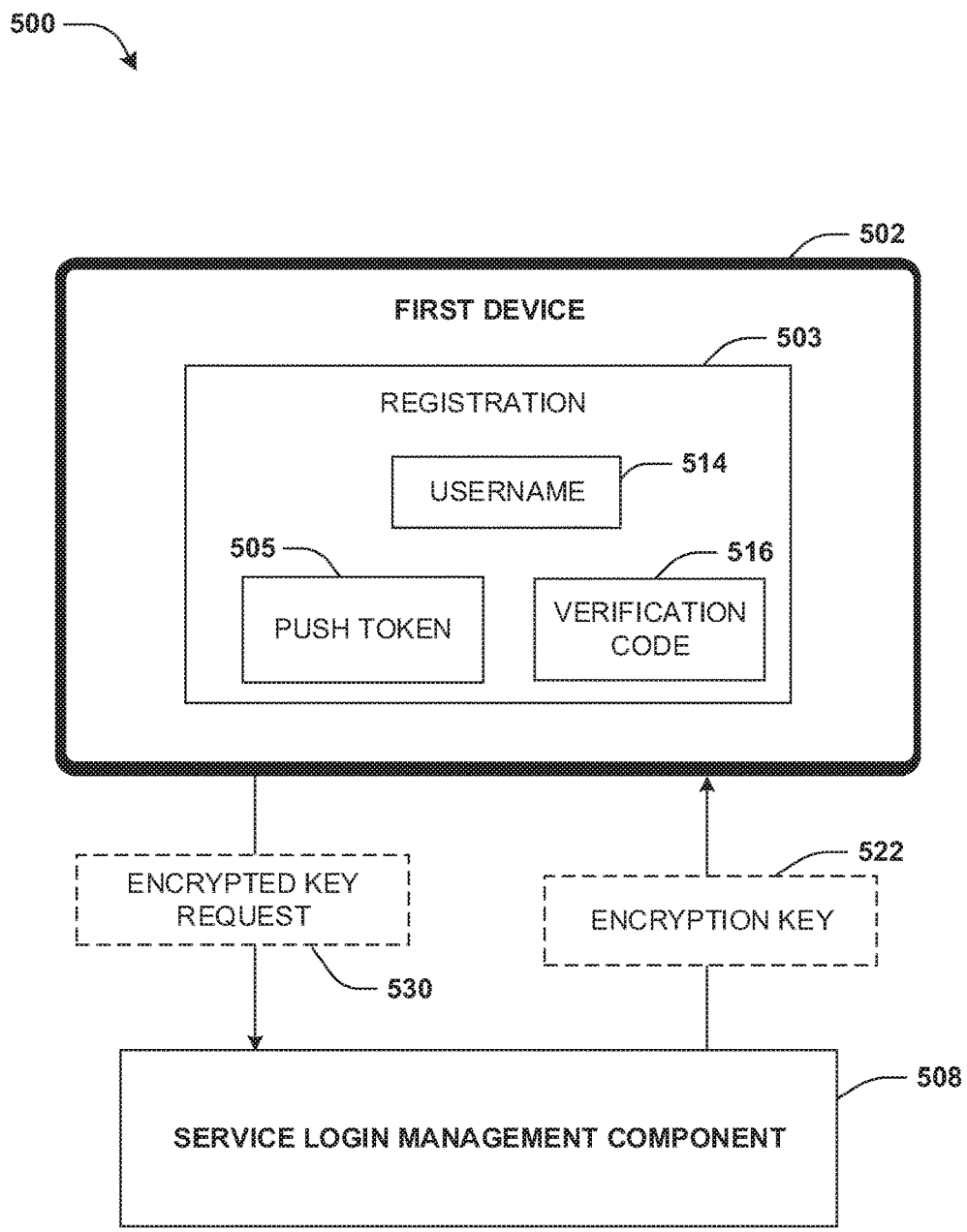
FIG. 5B is a component block diagram illustrating an example system for registration of a first device, where a verification code is verified.

FIGS. 5A-5B illustrate an example of a system 500, comprising a service login management component 508 associated with a service (e.g., comprising a server, an authorization database, etc.), for facilitating service login by registering a first device 502. In an example, the user may use the first device 502 to obtain a push token 505 for communicating with the service login management component 508. During registration, the user may log into the service from a second device 501 (e.g., webmail, a web service, an application, a game, etc.) using a username 514 and/or a password. The user may be successfully logged into the service responsive to the username 514 and password corresponding to an account of the user with the service. Responsive to a successful login to the service on the second device 501, the user may select an option, through a registration page 512, to register 504 the first device 502 for being authorized to authenticate the user for access to the service on the second device 501 later.

Responsive to the user selecting the option to register 504 the first device 502, the user may be sent a verification code 516 by the service login management component 508. The verification code 516 may be displayed to the user through the second device 501. During registration, the user may be prompted 506 to enter the verification code 516 through the first device 502.

FIG. 5B illustrates an example of the first device 502 providing an encrypted key request 530, comprising the username 514, the verification code 516, and the push token 505, to the service login management component 508. The service login management component 508 may verify the verification code 516, the username 514, and the push token 505.

Responsive to the verification code 516, the username 514, and the push token 505 being verified, the service login management component 508 may generate an encryption key 522. The service login management component 508 may store the encryption key 522. The service login management component 508 may send the encryption key 522 to the first device 502. The first device 502 may store the encryption key 522. Responsive to receiving the encryption key 522, the first device 502 may present the user with a notification that the first device 502 has been registered. The service login management component 508 may maintain the registration of the first device 502. The registration may specify a trust level for the first device 502.

Responsive to the verification code 516, the username 514, and the push token 505 not being verified, the service login management component 508 may send the first device 502 a failure notification indicating that the first device 502 was not registered. Responsive to the first device 502 receiving the failure notification, the first device 502 may present the user with the failure notification.

Figure 6A:
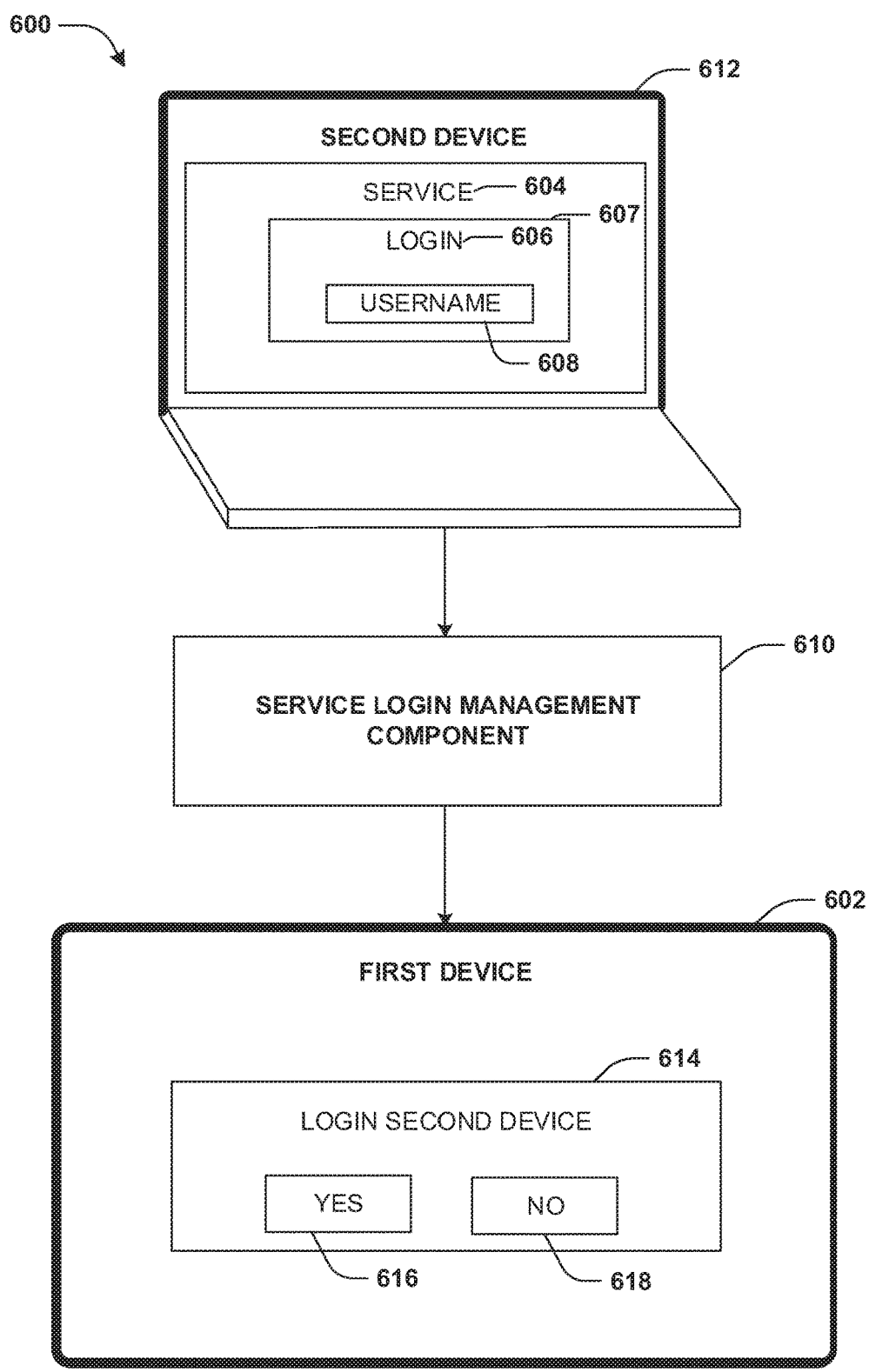
FIG. 6A is a component block diagram illustrating an example system for facilitating service login, where a first device is authorized to log a second device into a service.
Figure 6B:
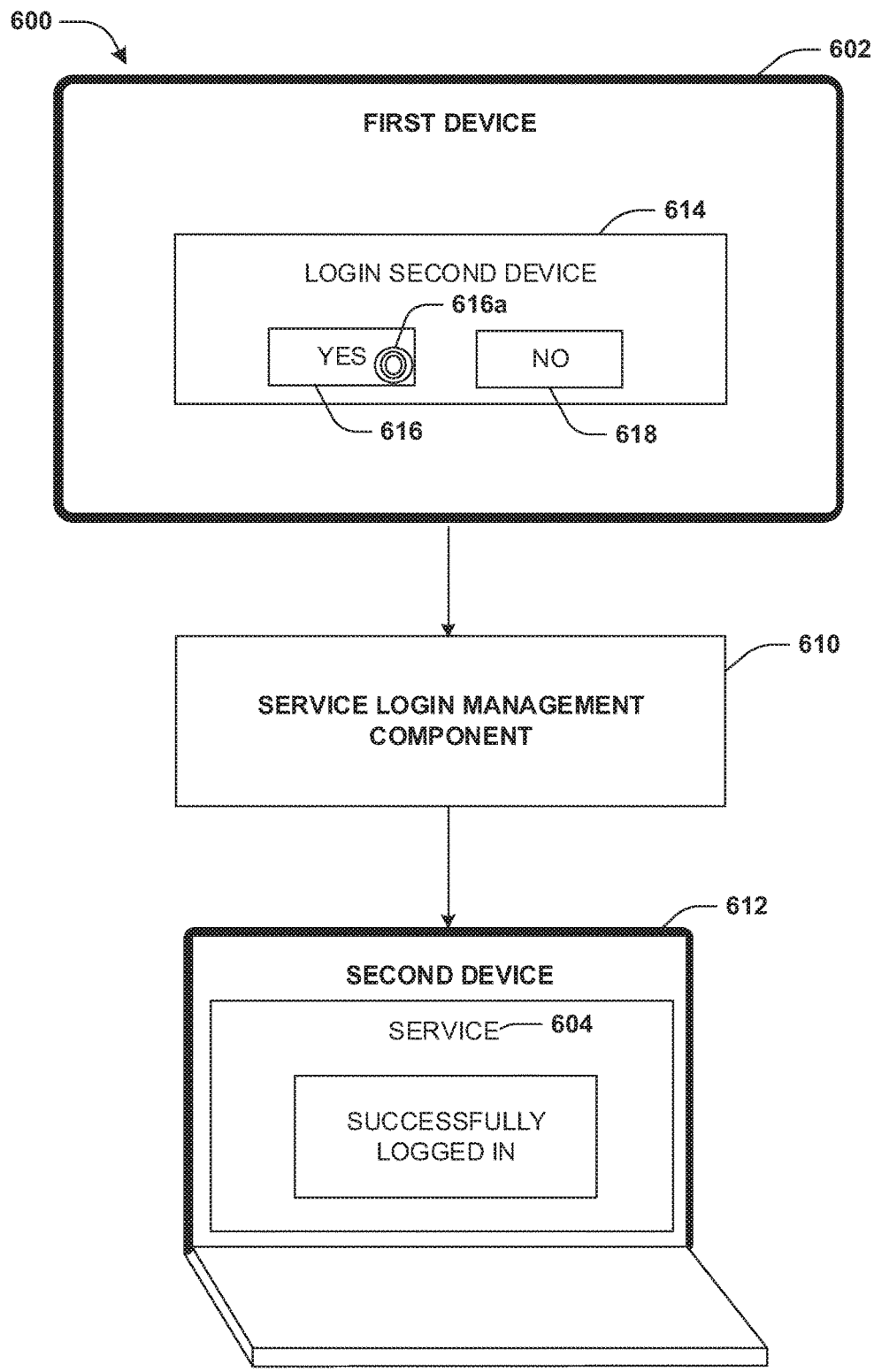
FIG. 6B is a component block diagram illustrating an example system for facilitating service login, where a second device is successfully logged in to a service.

FIGS. 6A-6B illustrate an example of a system 600, comprising a service login management component 610, for using a first device 602 (e.g., a device registered for authenticating the user to access a service from a second device 612) to authenticate a login of a second device 612 into a service 604. In an example, a user of the second device 612 may be presented with a login field 606 when attempting to access the service 604. For example, the user may be presented with an interface 607 comprising a prompt to enter a username 608 through the login field 606. The second device 612 may store device authorization information. The second device 612 may send an access request for the service to the service login management component 610. The access request may comprise the device authorization information.

The service login management component 610 may perform a search, within an authorization database, for the username 608. The username 608 may be associated, by an entry within the authorization database, with a push token, the first device 602, and/or an encryption key. A request may be generated by the service login management component 610 responsive to the access request. The request may be encrypted by the service login management component 610, using the encryption key, to generate an encrypted request. The encrypted request may be sent to the first device 602 using the push token.

The first device 602 may receive the encrypted request. The first device 602 may decrypt the encrypted request using the encryption key (e.g., the first device 602 having stored the encryption key when the first device 602 was registered). Responsive to receiving the request, the first device 602 may display a login interface 614 to the user comprising an option to indicate the user wants to yes 616 log in the second device 612, or no 618 does not want to log in the second device 612.

FIG. 6B illustrates an example of the system 600, comprising utilizing the first device 602 to instruct the service login management component 610 to log the user into the service on the second device 612. The user may select 616a yes 616 on the login interface 614 to generate a login user authentication notification. The first device 602 may encrypt the login user authentication notification using the encryption key to generate an encrypted login user authentication notification. The encrypted login user authentication notification may be sent to the service login management component 610. The service login management component 610 may decrypt the login user authentication notification. The login user authentication notification may instruct the service login management component 610 to log the user into the service on the second device 612. In an example, the user may log into the service on the second device 612 without entering a password.

Figure 7A:
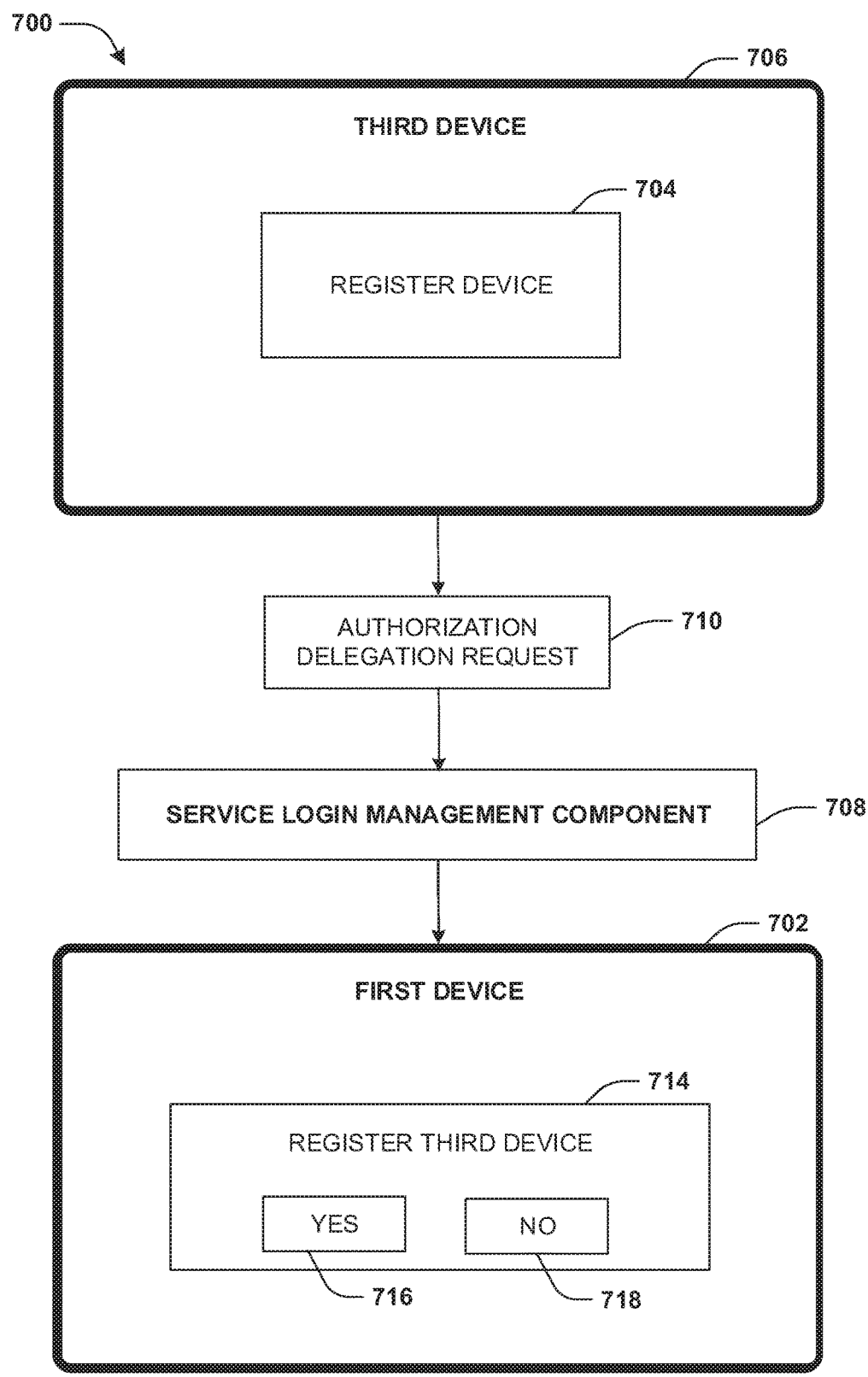
FIG. 7A is a component block diagram illustrating an example system for facilitating service login, where a third device generates an authorization delegation request.
Figure 7B:
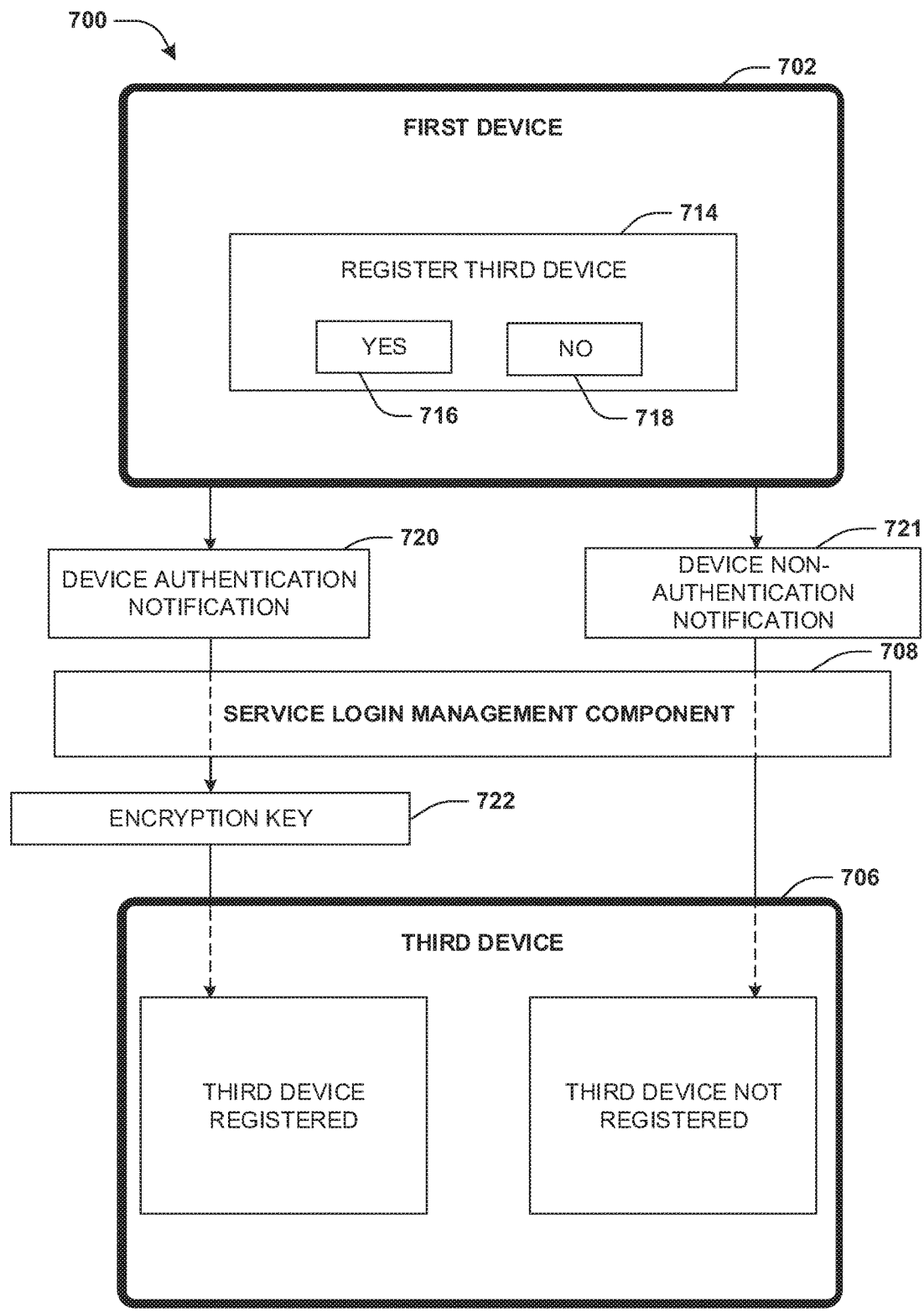
FIG. 7B is a component block diagram illustrating an example system for facilitating service login, where a third device is registered.

FIGS. 7A-7B illustrate an example of a system 700, comprising a service login management component 708 for delegating trust from a first device 702 (e.g., where the first device 702 comprises a registered device) to authenticate a third device 706. The user may log on to a service on the third device 706. Responsive to being logged into the service, the user may be presented with an option to register 704 the third device 706. Responsive to the user selecting the option to register 704 the third device 706, an authorization delegation request 710 may be sent to the service login management component 708.

The service login management component 708 may encrypt the authorization delegation request 710 using an encryption key to generate an encrypted authorization delegation request. The encrypted authorization delegation request may be sent to the first device 702. The first device 702 may decrypt the encrypted authorization delegation request using the encryption key (e.g., the first device 702 having stored the encryption key when the first device 702 was registered). Responsive to receiving the authorization delegation request, the first device 702 may display an authentication interface 714 to the user comprising an option to indicate the user wants to yes 716 authenticate the third device 706, or no 718 does not want to authenticate the third device 706.

FIG. 7B illustrates an example of the system 700, comprising utilizing the first device 702 to instruct the service login management component 710 to authenticate the third device 706. The user may select no 718 on the authentication interface 714 to generate a device non-authentication notification 721 to be sent to the service login management component 708. Responsive to the service login management component 708 receiving the device non-authentication notification 721, the service login management component 708 may not register the third device 706. The service login management component 708 may maintain a log of device non-authentication notifications 721.

The user may select yes 716 on the authentication interface 714 to generate a device authentication notification 720 that is sent to the service login management component 708. Responsive to the service login management component 708 receiving the device authentication notification 720, the service login management component 708 may send an encryption key 722 to the third device 706. Responsive to receiving the encryption key 722, the third device 706 may display a notification that the third device is registered.

A second registration of the third device 706 may be maintained by the service login management component 708. The second registration may specify a second trust level for the third device 706. The second trust level may be altered based upon at least one of successful authentication or unsuccessful authentication by the user of the third device 706 (e.g., the second trust level may increase based upon a successful authentication and the second trust level may decrease based upon an unsuccessful authentication, such as based upon a number of device non-authentication notices 721 received by the service login management component 708). In an example, if the second trust level exceeds a trust level threshold, then a push channel may be opened to the third device 706 for authenticating the user for accessing the service from a second device.

In an example, if the first device 702 and the third device 706 are registered, then at least one of a trust level and/or a viability score may be used to determine whether to send an access request, for authenticating the user to access the service from the second device, to the first device 702 or the third device 706. In an example, a first viability score of the first device 702 may be determined based upon a spatial proximity of the first device 702 relative to the user, a typing characteristic of the user on the first device 702 (e.g., a time between character entry may be consistent for the user, and thus may be an identifying characteristic of the user), a time of day, a temperature at a location of the user, user identification from imagery of the user captured by a device, voice recognition of audio captured by the device, etc. A second viability score of the third device 706 may be determined based upon a second spatial proximity of the third device 706 relative to the user, the typing characteristic of the user on the third device 706, the time of day (e.g., the user may be more likely to use the first device 702 during the day, and the third device 706 during an evening and/or night), the temperature, user identification from imagery of the user captured by a device, voice recognition of audio captured by the device, etc. In an example, the closer the first device 702 is to the user, the higher the first viability score, and the farther the first device 702 is from the user, the lower the first viability score. A spatial proximity may be determined based upon various factors such as a time since last use, a GPS location of a device, etc. In an example, responsive to the second viability score being greater than the first viability score, the request may be sent to the third device 706 using a push token. In an example, if the text entry on the first device 702 is consistent with the typing characteristic of the user, and a second text entry on the third device 706 is not consistent with the typing characteristic of the user, then the first viability score may exceed the second viability score.

In an example, a key ring (e.g., a password manager, password storage, etc.) may be utilized to delegate trust. For example, a registration of the first device 702 (e.g., a mobile phone device) may be maintained within a key ring account for the user. Responsive to receiving a phone number change request, the registration may be modified based upon the phone number change request. In this way, the user may maintain a registration of the mobile phone device, as being registered to authenticate the user for accessing the service from another device, even though the user may change a phone number of the mobile phone device.

Figure 8:
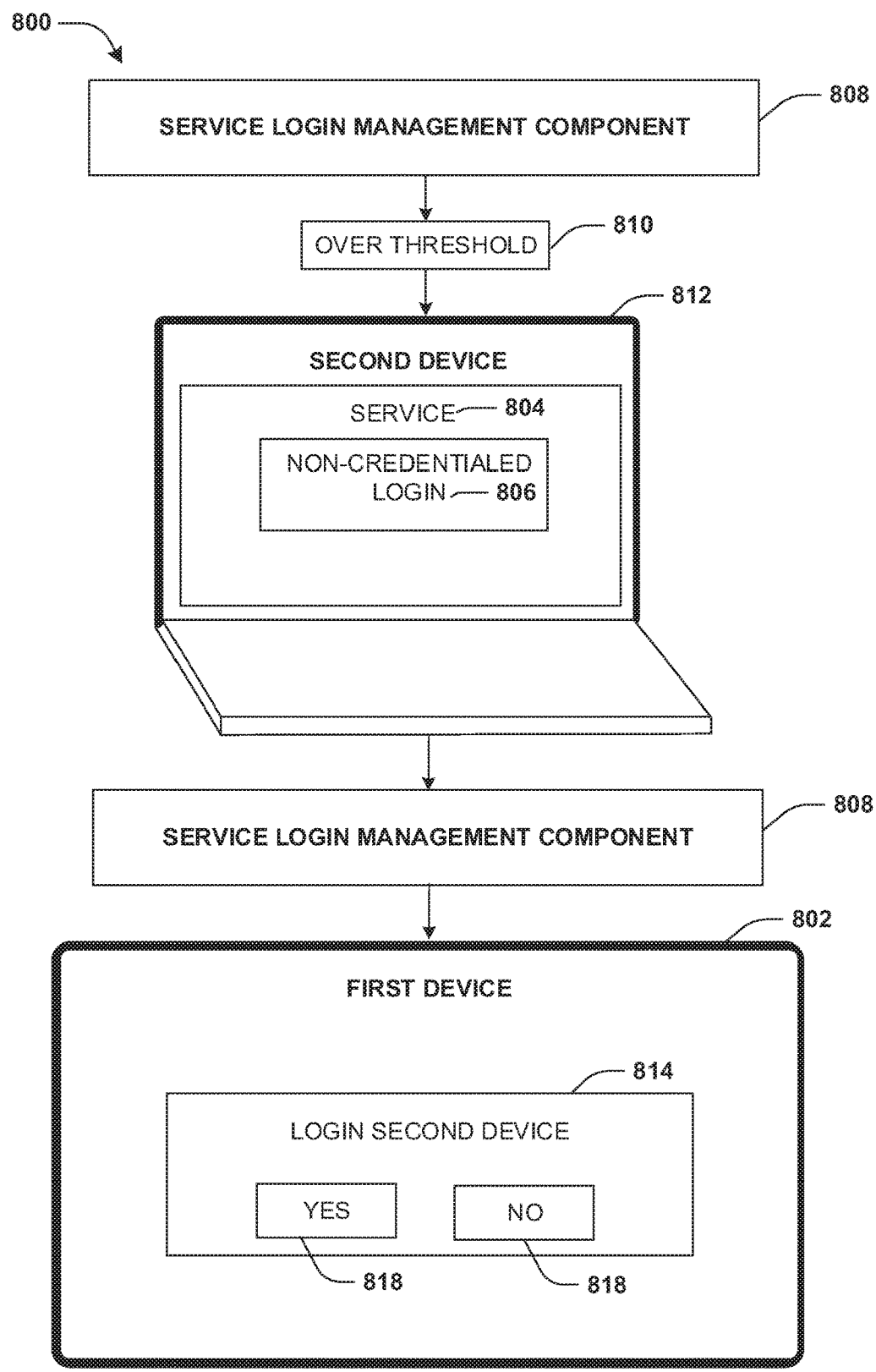
FIG. 8 is a component block diagram illustrating an example system for facilitating service login, where a threshold is exceeded.

FIG. 8 illustrates examples of a system 800, comprising a service login management component 808, for facilitating service login. The service login management component 808 may maintain a log of a number of logins of a second device 812. Responsive to the user accessing a service 804 on the second device 812, the service login management component 808 may determine whether the second device 812 has logged into the service 804 over a threshold 810 number of times within a first timeframe (e.g., 5 times in one month). Responsive to the user having logged into the service over the threshold 810 number of times within the first time frame (e.g., one month) from the second device 812, the user may be presented with an option to perform a non-credentialed login 806 (e.g., a login without entering a username and/or password).

Responsive to the user selecting the non-credentialed login 806, the second device 812 may send an access request comprising authorization information (e.g., cookies comprising the username, password, and/or push token) to the service login management component 808. The service login management component 808 may identify a trusted device (e.g., a registered device) such as a first device 802. The first device 802 may display a login interface 814. The login interface 814 may display an option for the user to select yes 816 to log the user into the service 804 on the second device 812 or to select no 818 to prevent the user from logging into the service 804 on the second device 812.

Figure 9:
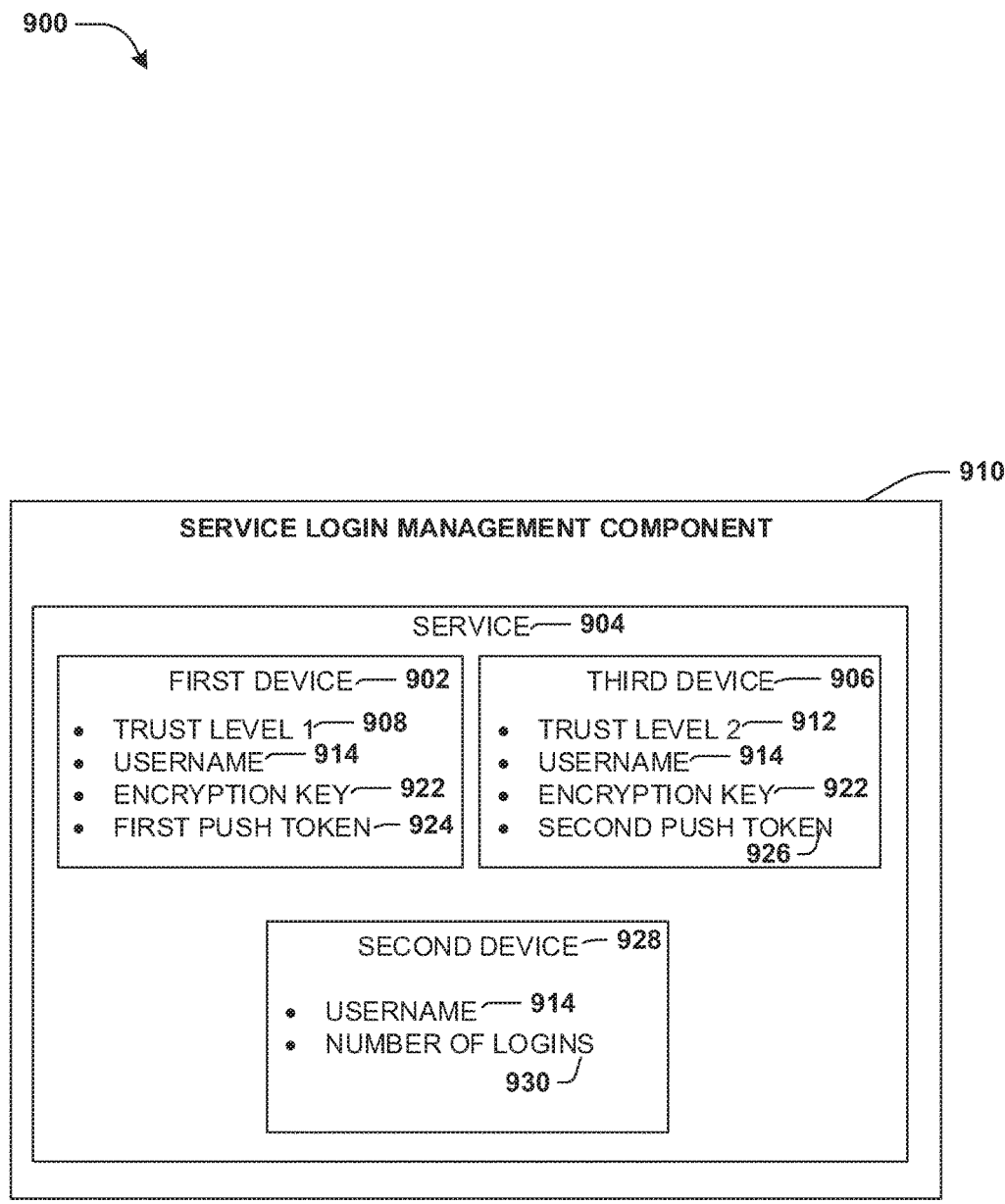
FIG. 9 is a component block diagram illustrating an example system of a service login management component.

FIG. 9 illustrates examples of a system 900 comprising a service login management component 910. The service login management component 910 may maintain an authorization database for a service 904. The authorization database may comprise entries corresponding to registered devices, such as a first device 902 and/or a third device 906 (e.g., devices registered to authenticate a user for accessing the service 904 from another device). The authorization database may associate the first device 902 with a first trust level 908, a username 914 that associates the user with the service 904, an encryption key 922, and/or a first push token 924. The database may associate the third device 906 with a second trust level 912, the username 914, the encryption key 922, and/or a second push token 926 (e.g., the first push token 924 may be a same or different push token from the second push token 926). The authorization database may maintain a record of devices with which the user has logged into the service 904, such as a second device 928. The authorization database may associate the second device 928 with the username 914 and/or a number of logins 930 by the user on the second device 928.

Figure 10:
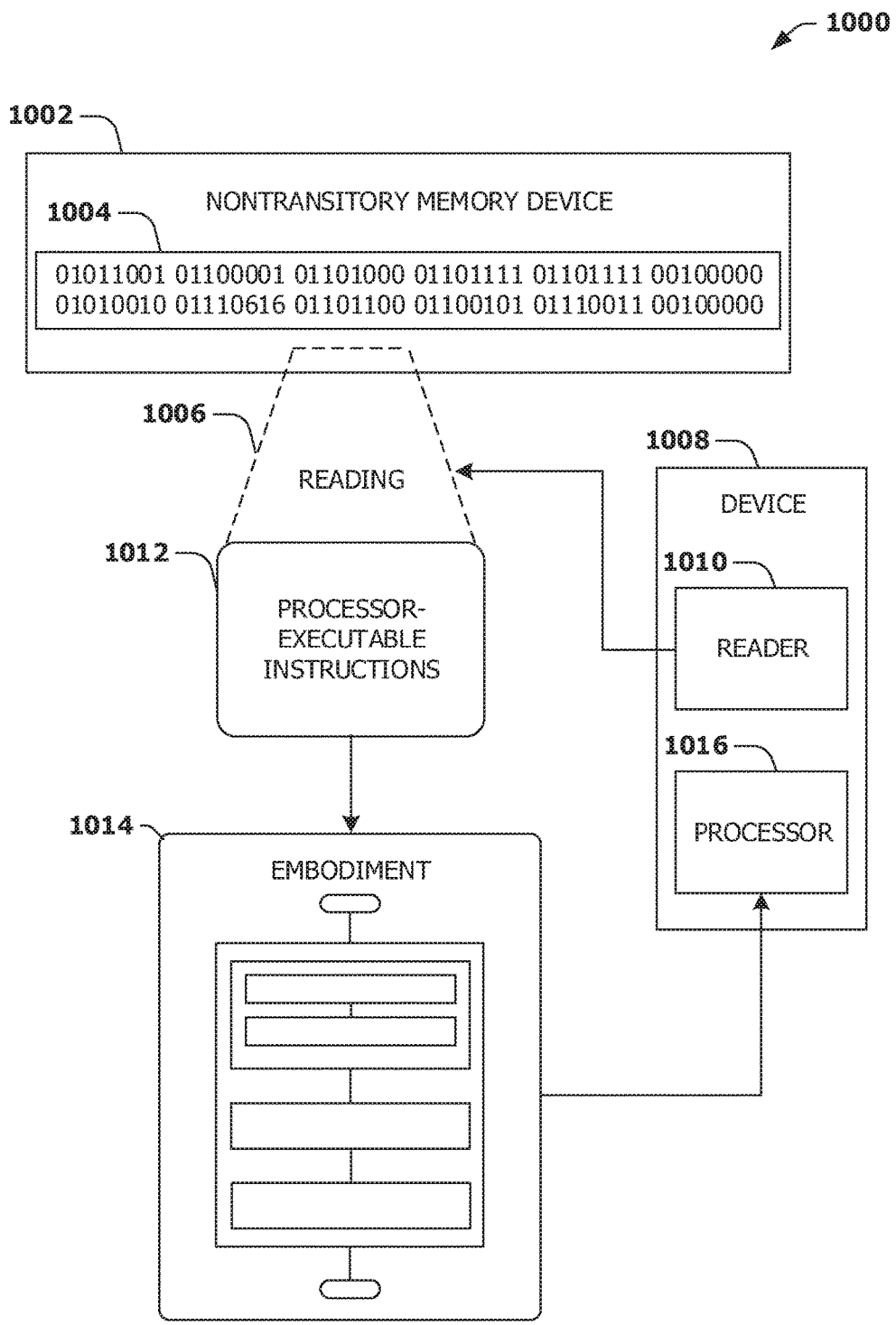
FIG. 10 is an illustration of a scenario featuring an example nontransitory memory device in accordance with one or more of the provisions set forth herein.

FIG. 10 is an illustration of a scenario 1000 involving an example nontransitory memory device 1002. The nontransitory memory device 1002 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 1002 stores computer-readable data 1004 that, when subjected to reading 1006 by a reader 1010 of a device 1008 (e.g., a read head of a hard disk drive, or a read operation invoked on a solid-state storage device), express processor-executable instructions 1012. In some embodiments, the processor-executable instructions, when executed on a processor 1016 of the device 1008, are configured to perform a method, such as at least some of the example method 400 of FIG. 4, for example. In some embodiments, the processor-executable instructions, when executed on the processor 1016 of the device 1008, are configured to implement a system, such as at least some of the example system 500 of FIGS. 5A-5B, at least some of the example system 600 of FIGS. 6A-6B, at least some of the example system 700 of FIGS. 7A-7B, at least some of the example system 800 of FIG. 8 and/or at least some of the example system 900 of FIG. 9, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system for facilitating service login, comprising:
   a processor; and
   memory comprising processor-executable instructions that when executed by the processor cause implementation of a service login management component configured to:
   register a first device, comprising a first processor, as having authorization to authenticate a user for accessing a service from a second device comprising a second processor;
   store device authorization information on the second device, the device authorization information specifying that the first device is registered as having authorization to authenticate the user;

receive an authorization delegation request, for a third device comprising a third processor, from the first device;

register the third device as having authorization to authenticate the user for accessing the service from the second device;

determine a first viability score of the first device corresponding to the user;

determine a second viability score of the third device corresponding to the user;

select, from amongst a plurality of devices comprising the first device and the third device, the first device as a destination for a request based upon a comparison of the first viability score and the second viability score;

responsive to the selecting the first device, as the destination for the request, from amongst the plurality of devices, send the request to the first device; and responsive to receiving a login user authorization notification from the first device in response to the request sent to the first device, log the user into the service on the second device.

2. The system of claim 1, the service login management component configured to:

maintain a count of user logins from the second device; and responsive to the count exceeding a threshold, instruct the second device to facilitate a non-credential login with the service.

3. The system of claim 1, the selecting based upon a determination that the first viability score is greater than the second viability score.

4. The system of claim 1, the first device comprising a mobile phone, and the service login management component configured to:

maintain a registration of the first device within a key ring account for the user; and responsive to receiving a phone number change request, modify the registration based upon the phone number change request.

5. The system of claim 1, the service login management component configured to:

maintain a registration of the first device, the registration specifying a trust level for the first device; and modify the trust level based upon at least one of successful authentication or unsuccessful authentication of the user by the first device.

6. The system of claim 5, the service login management component configured to:

maintain a second registration of the third device, the second registration specifying a second trust level for the third device; and responsive to the second trust level exceeding a trust level threshold, open a push channel to the third device for authenticating the user for accessing the service from the second device.

7. The system of claim 1, the service login management component configured to perform at least one of the determining the first viability score or the determining the second viability score based upon at least one of:

a spatial proximity relative to the user, a typing characteristic of the user, a time of day, a temperature at a location of the user, user identification from imagery of the user, or voice recognition of captured audio.

8. The system of claim 1, the service login management component configured to:

receive an access request for the service from the second device, the access request specifying a username; and query an authorization database using the username to identify a push token, the sending performed using the push token.

9. The system of claim 1, the service login management component configured to:

receive an access request for the service from the second device, the access request specifying a username;

query an authorization database using the username to identify an encryption key; and create the request using the encryption key.

10. A system for facilitating service login, comprising:

a processor; and memory comprising instructions that when executed by the processor perform operations comprising:

registering a first device, comprising a first processor, as having authorization to authenticate a user for accessing a service from a second device comprising a second processor;

registering a third device, comprising a third processor, as having authorization to authenticate the user for accessing the service from the second device;

determining a first viability score of the first device corresponding to the user;

determining a second viability score of the third device corresponding to the user;

selecting, from amongst a plurality of devices comprising the first device and the third device, the first device as a destination for a request based upon a comparison of the first viability score and the second viability score; and sending the request to the first device selected as the destination for the request.

11. The system of 10, the operations comprising:

responsive to receiving a login user authorization notification from the first device in response to the request sent to the first device, logging the user into the service on the second device.

12. The system of claim 10, the operations comprising:

maintaining a registration of the first device, the registration specifying a trust level for the first device; and modifying the trust level based upon at least one of successful authentication or unsuccessful authentication of the user by the first device.

13. The system of claim 12, the operations comprising:

maintaining a second registration of the third device, the second registration specifying a second trust level for the third device; and responsive to the second trust level exceeding a trust level threshold, opening a push channel to the third device for authenticating the user for accessing the service from the second device.

14. A method for facilitating service login, comprising:

registering a first device, comprising a first processor, as having authorization to authenticate a user for accessing a service from a second device comprising a second processor;

registering a third device, comprising a third processor, as having authorization to authenticate the user for accessing the service from the second device;

determining a first viability score of the first device corresponding to the user;

determining a second viability score of the third device corresponding to the user;

selecting, from amongst a plurality of devices comprising the first device and the third device, the first device as a destination for a request based upon a comparison of the first viability score and the second viability score;

sending the request to the first device selected as the destination for the request; and responsive to receiving a login user authorization notification from the first device in response to the request sent to the first device, logging the user into the service on the second device.

15. The method of claim 14, comprising:

maintaining a count of user logins from the second device; and responsive to the count exceeding a threshold, instructing the second device to facilitate non-credential logins with the service.

16. The method of claim 14, comprising:

receiving an authorization delegation request, for the third device, from the first device.

17. The method of claim 14, comprising:

maintaining a registration of the first device, the registration specifying a trust level for the first device; and modifying the trust level based upon at least one of successful authentication or unsuccessful authentication of the user by the first device.

18. The method of claim 17, comprising:

maintaining a second registration of the third device, the second registration specifying a second trust level for the third device; and responsive to the second trust level exceeding a trust level threshold, opening a push channel to the third device for authenticating the user for accessing the service from the second device.

19. The method of claim 14, the sending comprising:

responsive to the first viability score being greater than the second viability score, sending the request to the first device but not the third device.

20. The method of claim 14, comprising:

receiving device authorization information for the service from the second device; and storing the device authorization information within a login management cookie on the second device.

* * * * *